(12) United States Patent
Komoike et al.

(10) Patent No.: US 6,654,322 B2
(45) Date of Patent: Nov. 25, 2003

(54) FOCUS SERVO ACTUATING CIRCUIT AND OPTICAL DISK DEVICE INCORPORATING SAME

(75) Inventors: Mitsutaka Komoike, Hirakata (JP); Toru Kameyama, Daito (JP)

(73) Assignees: Sanyo Electric Co., Ltd., Osaka (JP); Sanyo Technosound Co., Ltd., Osaka (JP)

(*) Notice: Subject to any disclaimer, the term of this patent is extended or adjusted under 35 U.S.C. 154(b) by 270 days.

(21) Appl. No.: 09/964,612

(22) Filed: Sep. 28, 2001

(65) Prior Publication Data

US 2002/0039332 A1 Apr. 4, 2002

(30) Foreign Application Priority Data

Sep. 29, 2000 (JP) ........................................ 2000-299377

(51) Int. Cl.[7] ................................................. G11B 7/00
(52) U.S. Cl. ................................ 369/44.29; 369/44.28; 369/53.28
(58) Field of Search .......................... 369/44.27, 44.28, 369/44.29, 44.32, 44.35, 44.34, 53.1, 47.1, 53.28

(56) References Cited

U.S. PATENT DOCUMENTS 6,195,319 B1 * 2/2001 Ohshita et al. .......... 369/44.35
6,320,834 B1 * 11/2001 Tsuchinaga .............. 369/59.21

FOREIGN PATENT DOCUMENTS

JP        05-159315        6/1993

* cited by examiner

*Primary Examiner*—Muhammad Edun
(74) *Attorney, Agent, or Firm*—Armstrong, Westerman & Hattori, LLP

(57) ABSTRACT

In a disk device, a focus servo activating circuit causes an RF amplifier 3 to amplify a focus error signal within a predetermined gain adjusting range, causes a control circuit 4 to multiply the amplitude of the focus error signal obtained by the RF amplifier 3 by two coefficients to calculate two threshold values, and starts up a focus servo upon the amplified focus error signal passing the two threshold values. The focus servo can be started up normally even for optical disks of extremely low reflectivity.

6 Claims, 4 Drawing Sheets

(a) FE SIGNAL (b) FOCUS DRIVE SIGNAL

FOCUS SERVO ACTUATING CIRCUIT AND OPTICAL DISK DEVICE INCORPORATING SAME

FIELD OF THE INVENTION

The present invention relates to optical disk devices for optically reproducing signals from optical disks with an optical pickup, and more particularly to a focus servo activating circuit for initiating a focusing operation by activating a focus servo loop of the optical pickup.

BACKGROUND OF THE INVENTION

Generally with optical disk devices, a focus servo loop is formed for focusing the optical pickup based on a focus error signal prepared from the output signal of the optical pickup. When signals are to be reproduced, a focus actuator is driven with the focus servo loop held out of operation first to alter the focus position of the pickup in one direction to obtain focus error signal, i.e., an S-shaped focus error signal. FIG. 4(a) shows the S-shaped curve of the focus error signal (hereinafter referred to as the "FE signal"), and FIG. 4(b) shows a drive signal for the focus actuator (focus drive signal). The zero-cross point of the FE signal shown in FIG. 4(a) is detected to activate the focus servo loop at the zero-cross point, whereby a focus servo is completed.

In order to avoid the influence of noise or offset that becomes incorporated into the FE signal in detecting the zero-cross point of the FE signal, two fixed threshold values, i.e., first and second threshold values TH1, TH2, are set as shown in FIG. 5. The S-shaped FE signal first passes the first threshold value TH1 in the course of an increase, and thereafter passes the second threshold value TH2 during a decrease, whereupon the focus servo is started up (activated).

Since the magnitude of the FE signal differs, for example, with the reflectivity of the optical disk and variations in the sensitivity of the optical pickup, it is practice to amplify the FE signal for the normalization of the amplitude of the FE signal to obtain an FE signal of definite level. FIG. 6 shows an FE signal as amplified to a normalized amplitude (peak-peak).

However, the amplifier for amplifying the FE signal is limited in the adjusting range of the gain, so that in the case of optical disks, such as CD-RW, which are extremely low in reflectivity, it is not always possible to amplify the amplitude of the FE signal to a normalized amplitude within the gain adjusting range. In such a case, the FE signal is unable to exceed the threshold value TH1 as seen in FIG. 7, giving rise to the problem that the focus servo can not be started up normally.

SUMMARY OF THE INVENTION

Accordingly, an object of the present invention is to provide a focus servo activating circuit for optical disk devices which is capable of starting up a focus servo even for optical disks of extremely low reflectivity.

In an optical disk device embodying the present invention, a focus servo activating circuit comprises:
amplification means for amplifying an FE signal within a predetermined gain adjusting range in order to obtain a prescribed amplitude value,
calculation means for calculating one or a plurality of threshold values by multiplying the amplitude of the FE signal amplified by the amplification means by one or a plurality of predetermined coefficients, and
control means for starting up a focus servo upon the amplified FE signal passing the threshold value or values.

With the focus servo activating circuit of the present invention described, the magnitude of one or a plurality of threshold values is variably determined in conformity with the magnitude of amplitude of the FE signal as amplified. For example if the amplitude of the FE signal is smaller than the prescribed value, the value of one or the plurality of threshold values is set to a small value, so that the amplified FE signal is capable of passing the threshold values, whereupon the focus servo is started up.

Stated specifically, the amplification means decreases the gain when the amplitude of the FE signal is in excess of the prescribed value while increasing the gain when the amplitude of the FE signal is below the prescribed value, and the FE signal obtained at the gain thus set is amplified to the prescribed value, or upon the gain thus set reaching a limit of the gain adjusting range, the amplitude of the resulting FE signal is given to the calculation means. With the specific construction, the gain is adjusted within the gain adjusting range so as to obtain the prescribed amplitude value. When the prescribed amplitude value can be obtained within the gain adjusting range, the prescribed amplitude is obtained, whereas if it is impossible to obtain the prescribed value within the adjusting range, an amplitude which is close to the prescribed value to the greatest possible extent can be obtained.

Further stated specifically, the calculation means multiplies the amplitude of the amplified FE signal by two predetermined coefficients to calculate a first threshold value for the FE signal to pass while increasing, and a second threshold value for the FE signal to pass while decreasing to approach a zero-cross point after increasing. With the specific construction, the S-shaped curve is detected by the FE signal passing the first threshold value first, and the zero-cross point of the S-shaped curve is detected upon the FE signal subsequently passing the second threshold value.

With the focus servo activating circuit of the present invention for use in the optical disk device embodying the invention, appropriate threshold values are determined in conformity with the amplitude of the FE signal obtained from an optical disk even if the disk is extremely low in reflectivity. The zero-cross point can therefore be detected reliably, so that the focus servo can always be started up normally.

DETAILED DESCRIPTION OF EMBODIMENT

Figure 1:
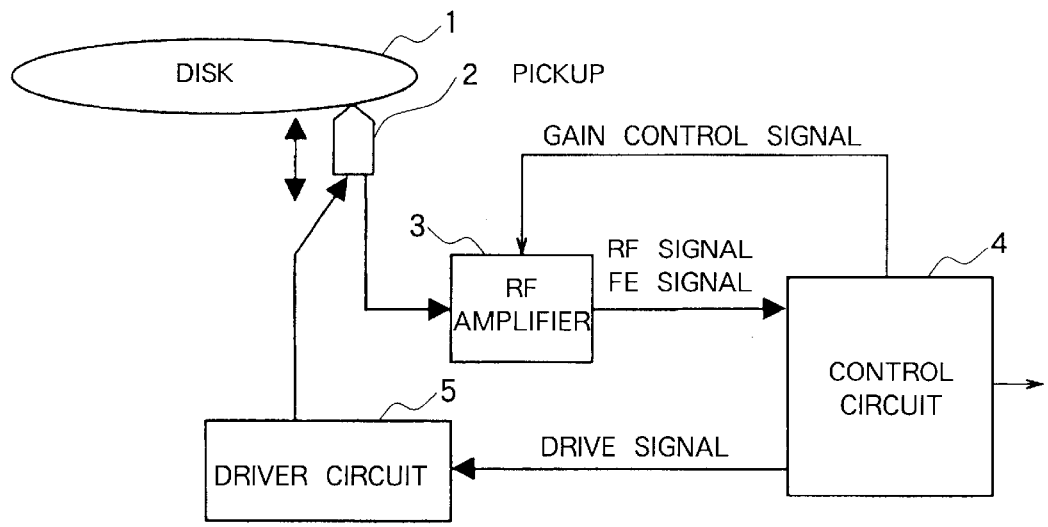
FIG. 1 is a block diagram showing the overall construction of an optical disk device embodying the invention.

An embodiment of the present invention will be described below in detail with reference to the drawings. As shown in FIG. 1, the optical disk device embodying the invention comprises an optical pickup 2 for optically reading signals from an optical disk 1. The pickup 2 performs the operations of servos, such as tracking servo and focus servo, in conformity with actuator drive signals fed from a driver circuit 5.

The output signal of the pickup 2 is fed to an RF amplifier 3, by which an RF signal and FE signal are produced. The RF signal and FE signal are fed to a control circuit 4, which prepares reproduction data based on the RF signal, and a gain control•signal for the RF amplifier 3 and a drive signal for the driver circuit 5 based on the FE signal. For example, for the focus servo of the optical pickup 2, the control circuit 4 prepares a focus drive signal and feeds the signal to the driver circuit 5, which drives the focus actuator of the pickup 2 in accordance with the signal.

Figure 4:
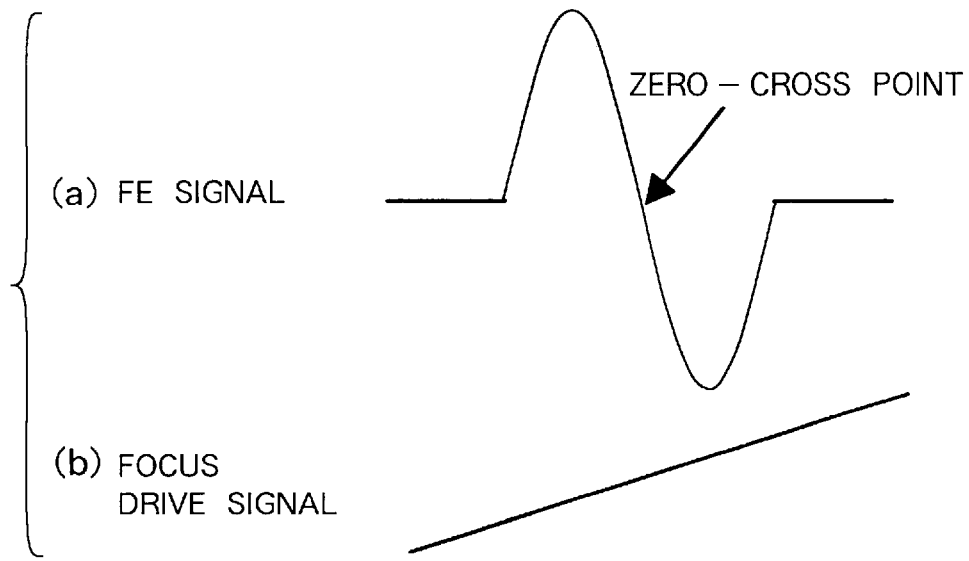
FIG. 4 is a waveform diagram showing an S-shaped FE signal and a focus drive signal.
Figure 5:
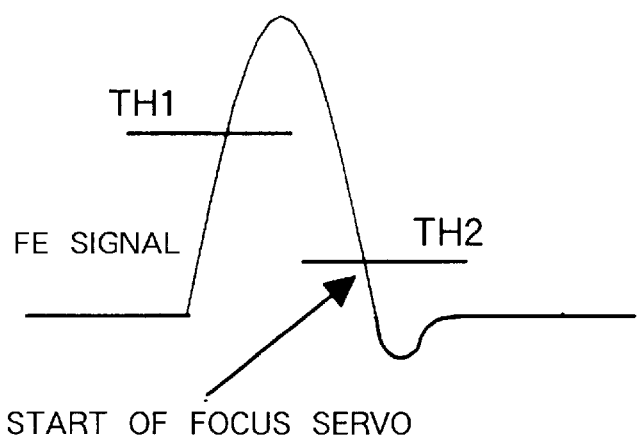
FIG. 5 is a waveform diagram showing a point of the S-shaped FE signal for starting up a focus servo.
Figure 6:
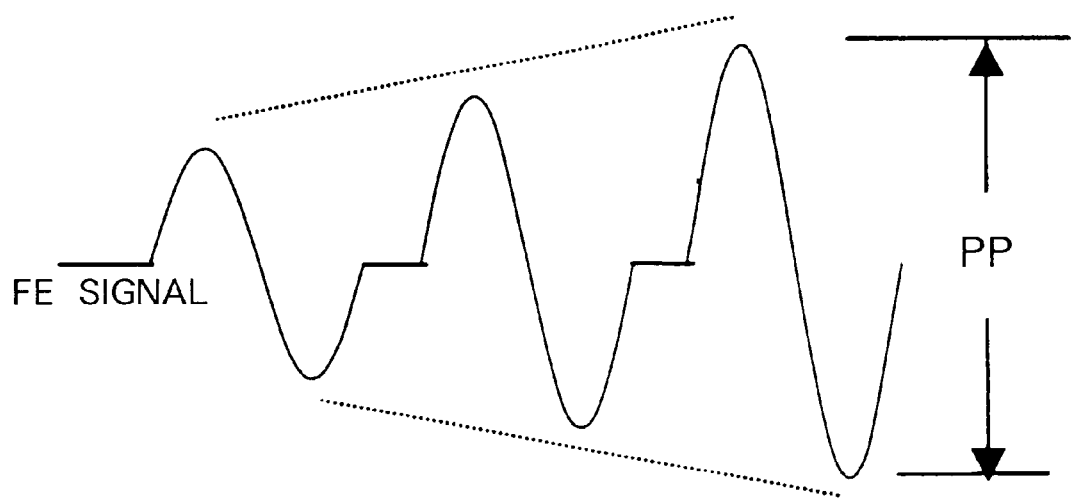
FIG. 6 is a waveform diagram showing an FE signal as adjusted in gain.
Figure 7:
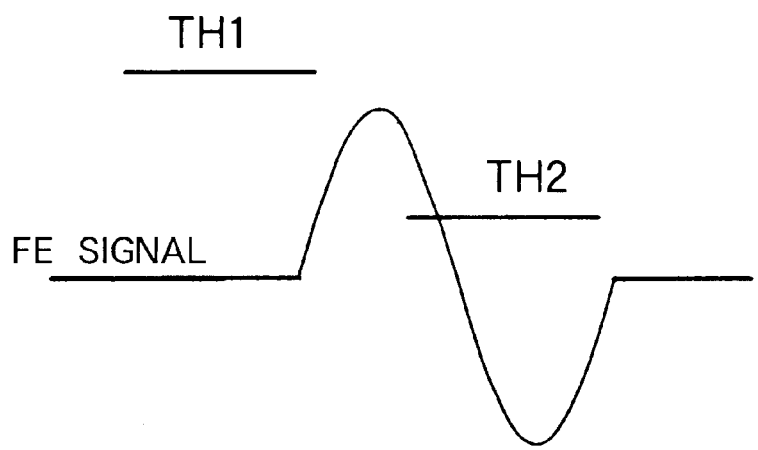
FIG. 7 is a waveform diagram showing the relationship between an FE signal in a conventional optical disk device and two threshold values.

The RF amplifier 3 amplifies the FE signal within a gain adjusting range based on the gain control signal fed from the control circuit 4 (see FIG. 6). When signals are to be reproduced, the control circuit 4 feeds to the driver circuit 5 a focus drive signal varying as shown in FIG. 4($b$), with a focus servo loop inactivated, and detects the zero-cross point of the S-shaped FE signal thereby obtained, whereupon the circuit 4 activates the focus servo loop.

Figure 2:
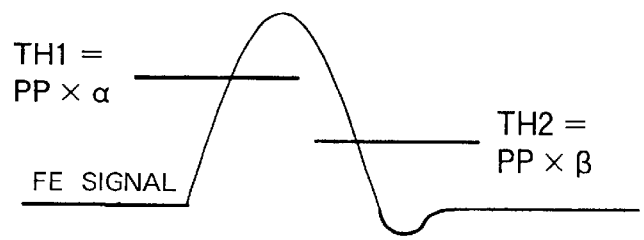
FIG. 2 is a waveform diagram showing the relationship between an FE signal and two threshold values in the optical disk device of the invention.

In detecting the zero-cross point of the S-shaped FE signal, the amplitude value PP of the FE signal obtained by the RF amplifier 3 is multiplied by two constants $\alpha$ and $\beta$ to calculate first and second threshold values TH1, TH2 as shown in FIG. 2. After passing the first threshold value first, the FE signal then passes the second threshold value. This time point is detected as the zero-cross point.

Figure 3:
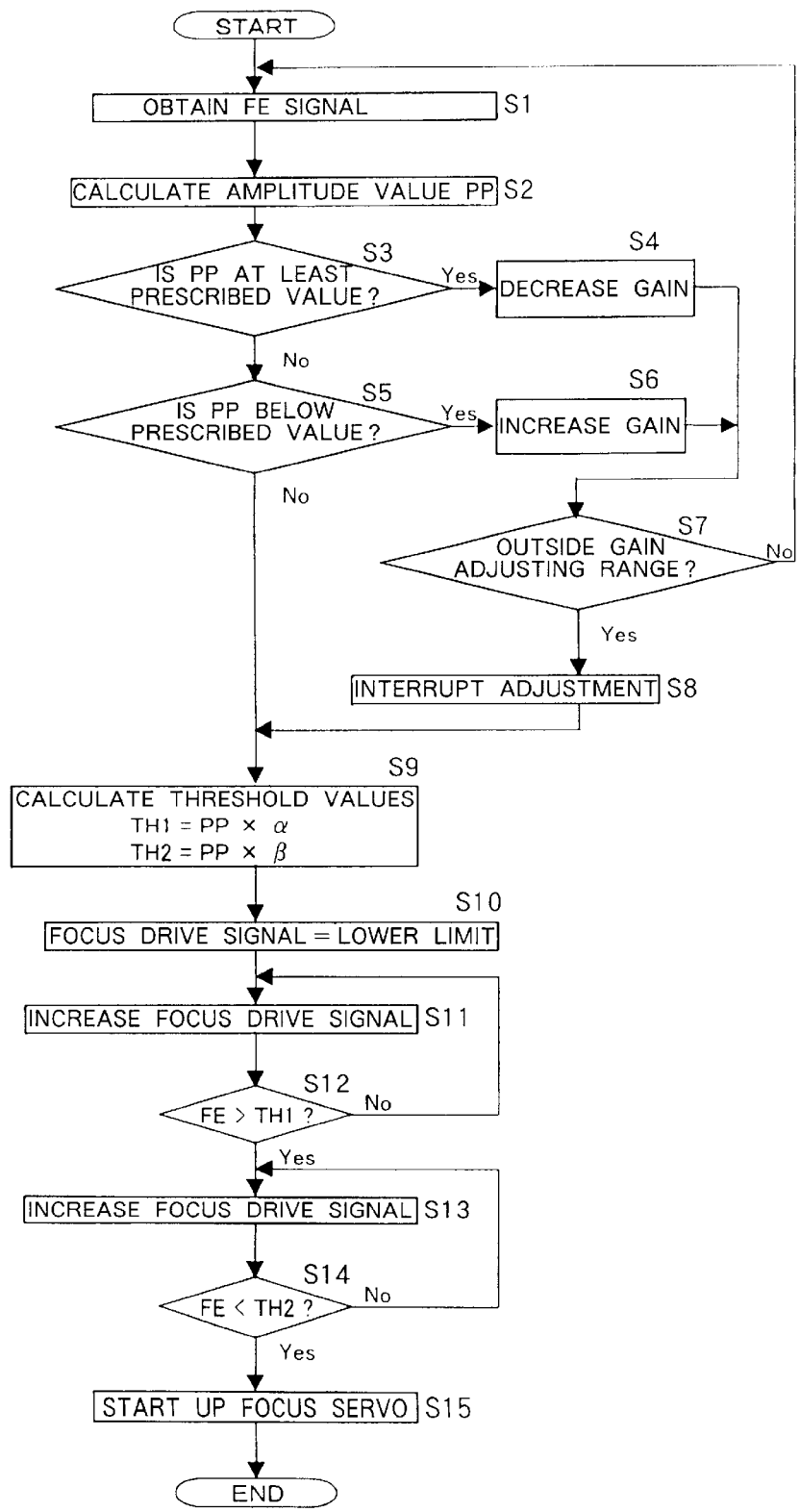
FIG. 3 is a flow chart showing a procedure for activating a focus servo loop according to the invention.

FIG. 3 shows the procedure to be performed by the control circuit 4 for activating the focus servo loop. The S-shaped FE signal is obtained first in step S1, and the amplitude value PP from the peak on the plus side to the peak on the minus side of the S-shaped curve is calculated in step S2. An inquiry is made subsequently in step S3 as to whether the amplitude value PP is at least a prescribed value. If the answer is affirmative, step S4 follows to decrease the gain. If the inquiry of step S3 is answered in the negative, step S5 follows to inquire whether the amplitude value PP is less than the prescribed value. If the answer is affirmative, the sequence proceeds to step S6 to increase the gain.

After the gain has been altered in step S4 or step S6, step S7 follows to inquire whether the gain is brought out of the gain adjusting range. When the answer is negative, the sequence returns to step 1 to repeat the adjustment of gain. When the gain is consequently set to the prescribed value, the inquiry of step S5 is answered in the negative, followed by step S9. Alternatively if the gain is brought out of the gain adjusting range, the inquiry of step S7 is answered in the affirmative, and the adjustment of the gain is interrupted in step S8, followed by step S9.

In step S9, the amplitude value PP of the FE signal obtained at the adjusted gain is multiplied by the foregoing constants $\alpha$ and $\beta$ to calculate first and second threshold values TH1, TH2. The focus drive signal is set at a lower limit value in step S10 and thereafter increased in step S11. Subsequently, step S12 inquires whether the FE signal has exceeded the first threshold value TH1. The step S11 is repeated until the inquiry is answered in the affirmative.

When the inquiry of S12 is answered in the affirmative, with the FE signal in excess of the first threshold value TH1, step S13 follows to further increase the focus drive signal. An inquiry is then made in step S14 as to whether the FE signal is below the second threshold value. Step S13 is repeated until the inquiry is answered in the affirmative. When the inquiry of step S14 is answered in the affirmative, with the FE signal falling below the second threshold value, step S15 follows to start up the focus servo.

Incidentally, the constants $\alpha$ and $\beta$ can be determined by experiments. For example, suppose when the prescribed value for the amplitude value PP is "200," optimum values for the first and second threshold values, TH1, TH2 are "50" and "20," respectively. At this time, $\alpha$ is 0.25, and $\beta$ is 0.10, so that the first and second threshold values, TH1 and TH2 can be calculated by multiplying the amplitude value PP by 0.25 and 0.10, respectively, in the case where the amplitude value PP is below the prescribed value.

With the optical disk device described, the first and second threshold values TH1, TH2 are variably determined in conformity with the amplitude value of the FE signal available from the RF amplifier 3 even if the amplitude value is below the prescribed value because the reflectively of the optical disk 1 is extremely low, so that the S-shaped FE signal passes the two threshold values at all times to reliably detect the zero-cross point. The focus servo loop can therefore be activated based on the detection.

What is claimed is:

1. A focus servo activating circuit for starting up a focus servo at a zero-cross point of a focus error signal produced when the focus position of an optical pickup is altered in one direction, the focus servo activating circuit comprises:

amplification means for amplifying a focus error signal within a predetermined gain adjusting range in order to obtain a prescribed amplitude value, calculation means for calculating one or a plurality of threshold values by multiplying the amplitude of the focus error signal amplified by the amplification means by one or a plurality of predetermined coefficients, and control means for starting up the focus servo upon the amplified focus error signal passing the threshold value or values.

2. A focus servo activating circuit according to claim 1 wherein the amplification means decreases the gain when the amplitude of the focus error signal is in excess of the prescribed value while increasing the gain when the amplitude of the focus error signal is below the prescribed value, and the focus error signal obtained at the gain thus set is amplified to the prescribed value, or upon the gain thus set reaching a limit of the gain adjusting range, the amplitude of the resulting focus error signal is given to the calculation means.

3. A focus servo activating circuit according to claim 1 wherein the calculation means multiplies the amplitude of the amplified focus error signal by two predetermined coefficients to calculate a first threshold value for the focus error signal to pass while increasing, and a second threshold value for the focus error signal to pass while decreasing to approach a zero-cross point after increasing.

4. An optical disk device wherein a focus error signal is produced based on an output signal of an optical pickup, and the focusing movement of the pickup is controlled based on the focus error signal, the optical disk device comprising a focus servo activating circuit for stating up a focus servo at a zero-cross point of a focus error signal produced when the focus position of an optical pickup is altered in one direction, the focus servo activating circuit comprises:

amplification means for amplifying an FE signal within a predetermined gain adjusting range in order to obtain a prescribed amplitude value, calculation means for calculating one or a plurality of threshold values by multiplying the amplitude of the FE signal amplified by the amplification means by one or a plurality of predetermined coefficients, and control means for starting up the focus servo upon the amplified FE signal passing the threshold value or values.

5. An optical disk device according to claim 4 wherein the amplification means of the focus servo activating circuit decreases the gain when the amplitude of the focus error signal is in excess of the prescribed value while increasing the gain when the amplitude of the focus error signal is below the prescribed value, and the focus error signal obtained at the gain thus set is amplified to the prescribed value, or upon the gain thus set reaching a limit of the gain adjusting range, the amplitude of the resulting focus error signal is given to the calculation means.

6. An optical disk device according to claim 4 wherein the calculation means of the focus servo activating circuit multiplies the amplitude of the amplified focus error signal by two predetermined coefficients to calculate a first threshold value for the focus error signal to pass while increasing, and a second threshold value for the focus error signal to pass while decreasing to approach a zero-cross point after increasing.

* * * * *